US011568527B2

(12) United States Patent
Pan et al.

(10) Patent No.: US 11,568,527 B2
(45) Date of Patent: Jan. 31, 2023

(54) VIDEO QUALITY ASSESSMENT USING AGGREGATED QUALITY VALUES

(71) Applicant: ATI TECHNOLOGIES ULC, Markham (CA)

(72) Inventors: Feng Pan, Markham (CA); Yang Liu, Toronto (CA); Crystal Sau, Markham (CA); Wei Gao, Markham (CA); Mingkai Shao, Markham (CA); Dong Liu, Markham (CA); Ihab Amer, Markham (CA); Gabor Sines, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/031,076

(22) Filed: Sep. 24, 2020

(65) Prior Publication Data

US 2022/0092760 A1 Mar. 24, 2022

(51) Int. Cl.
*G06T 7/00* (2017.01)
*H04N 17/00* (2006.01)
*H04N 21/234* (2011.01)
*G06V 10/30* (2022.01)
*G06V 10/50* (2022.01)
*G06V 10/75* (2022.01)

(52) U.S. Cl.
CPC .......... *G06T 7/0002* (2013.01); *G06V 10/30* (2022.01); *G06V 10/50* (2022.01); *G06V 10/751* (2022.01); *H04N 17/004* (2013.01); *H04N 21/23418* (2013.01); *G06T 2207/10016* (2013.01); *G06T 2207/30168* (2013.01)

(58) Field of Classification Search
None
See application file for complete search history.

(56) References Cited

U.S. PATENT DOCUMENTS

| 9,591,304 | B2 * | 3/2017 | Kau | G06T 7/0002 |
| 2007/0257988 | A1 * | 11/2007 | Ong | H04N 17/004 348/182 |
| 2009/0148058 | A1 * | 6/2009 | Dane | H04N 19/172 382/251 |
| 2010/0053336 | A1 * | 3/2010 | Bourret | H04N 17/004 348/180 |
| 2011/0007968 | A1 * | 1/2011 | Yamada | H04N 17/00 382/165 |
| 2014/0002670 | A1 * | 1/2014 | Kolarov | H04N 17/004 348/180 |
| 2014/0177734 | A1 * | 6/2014 | Carmel | H04N 19/154 375/240.26 |
| 2015/0078654 | A1 * | 3/2015 | Chaudhury | G06V 20/46 382/159 |
| 2016/0021376 | A1 * | 1/2016 | Andreopoulos | H04N 17/004 348/181 |
| 2016/0309157 | A1 * | 10/2016 | Muthu | H04N 19/176 |
| 2021/0117691 | A1 * | 4/2021 | Shen | G06T 7/90 |

* cited by examiner

*Primary Examiner* — Delomia L Gilliard

(57) ABSTRACT

Calculating, for each frame of a plurality of frames, a corresponding quality value; calculating, for each frame of the plurality of frames, based on one or more visual attributes of a frame, a weight for the corresponding quality value of the frame; calculating an aggregate quality value for the plurality of frames based on the weight and the corresponding quality value for each frame of the plurality of frames; and providing an assessment of the plurality of frames based on the aggregate quality value for the plurality of frames.

22 Claims, 6 Drawing Sheets

VIDEO QUALITY ASSESSMENT USING AGGREGATED QUALITY VALUES

BACKGROUND

A quality value for a video sequence is calculated by applying a quality metric algorithm to each frame and averaging the quality values for each frame. This approach assumes that each block of a given frame contributes equally to the quality value of the frame, and that each frame contributes equally to the quality of the video sequence. However, the human vision system would not perceive the quality of each frame and/or block equally.

DETAILED DESCRIPTION

Figure 1:
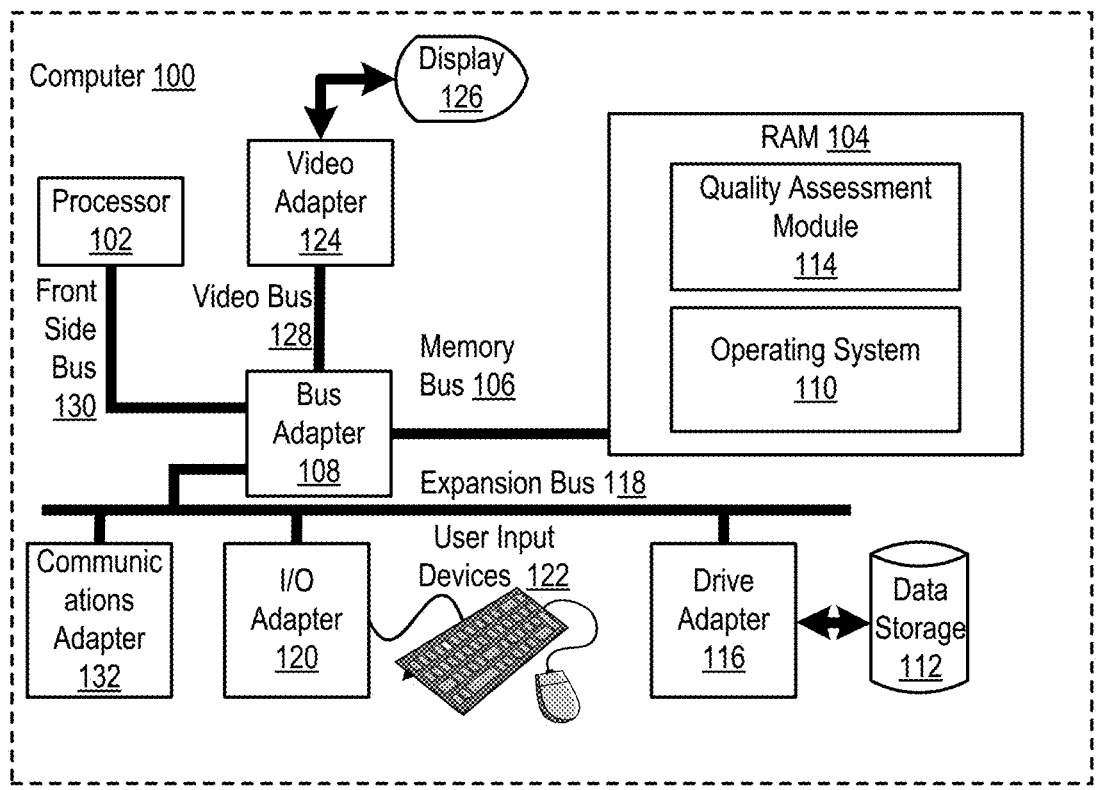
FIG. 1 is a block diagram of an example processor for video quality assessment using aggregated quality values according to some embodiments.

In some embodiments, a method of video quality assessment using aggregated quality values includes: calculating, for each frame of a plurality of frames, a corresponding quality value; calculating, for each frame of the plurality of frames, based on one or more visual attributes of a frame, a weight for the corresponding quality value of the frame; calculating an aggregate quality value for the plurality of frames based on the weight and the corresponding quality value for each frame of the plurality of frames; and provide an assessment of the plurality of frames based on the aggregate quality value for the plurality of frames.

In some embodiments, the one or more visual attributes of the frame include a temporal complexity of the frame, a spatial complexity of the frame, and/or the corresponding quality value of the frame. In some embodiments, the one or more visual attributes of the frame include the corresponding quality value of the frame, and calculating, for each frame of the plurality of frames, the weight for the corresponding quality value of the frame comprises: identifying a first subset of the plurality of frames having corresponding quality values falling below a threshold; identifying a second subset of the plurality of frames having corresponding quality values meeting or exceeding the threshold; and assigning a first weight to each frame in the first subset and a second weight to each frame in the second subset. In some embodiments, the temporal complexity of the frame is based on one or more pixel differences with respect to one or more other frames and/or one or more motion vectors. In some embodiments, the spatial complexity is based on a degree of variance of one or more areas within the frame.

In some embodiments, an apparatus for video quality assessment using aggregated quality values performs steps including: calculating, for each frame of a plurality of frames, a corresponding quality value; calculating, for each frame of the plurality of frames, based on one or more visual attributes of a frame, a weight for the corresponding quality value of the frame; calculating an aggregate quality value for the plurality of frames based on the weight and the corresponding quality value for each frame of the plurality of frames; and provide an assessment of the plurality of frames based on the aggregate quality value for the plurality of frames.

In some embodiments, the one or more visual attributes of the frame include a temporal complexity of the frame, a spatial complexity of the frame, and/or the corresponding quality value of the frame. In some embodiments, the one or more visual attributes of the frame include the corresponding quality value of the frame, and calculating, for each frame of the plurality of frames, the weight for the corresponding quality value of the frame comprises: identifying a first subset of the plurality of frames having corresponding quality values falling below a threshold; identifying a second subset of the plurality of frames having corresponding quality values meeting or exceeding the threshold; and assigning a first weight to each frame in the first subset and a second weight to each frame in the second subset. In some embodiments, the temporal complexity of the frame is based on one or more pixel differences with respect to one or more other frames and/or one or more motion vectors. In some embodiments, the spatial complexity is based on a degree of variance of one or more areas within the frame.

In some embodiments, a method of video quality assessment using aggregated quality values includes: calculating, for each block of a plurality of blocks of a frame, a corresponding quality value; calculating, for each block of the plurality of blocks, based on one or more visual attributes of a block, a weight for the corresponding quality value of the block; calculating an aggregate quality value for the frame based on the weight and the corresponding quality value for each block for the plurality of blocks; and provide an assessment based on the aggregate quality value for the frame.

In some embodiments, each block includes one or more rows of pixels and one or more columns of pixels within the frame. In some embodiments, the one or more visual attributes of the block include a temporal complexity of the block, a spatial complexity of the block, the corresponding quality value of the block, or an importance value of the block based on an importance map of the frame. In some embodiments, the method further includes generating an importance map of the frame by classifying areas of the frame into one or more categories. In some embodiments, the one or more categories include a flat area, a textured area, or an edge area. In some embodiments, the frame is included in a plurality of frames, and the method further includes calculating, based on the aggregate quality value for the frame and one or more other aggregate quality values for one or more other frames, an aggregate quality value for the plurality of frames.

In some embodiments, an apparatus for video quality assessment using aggregated quality values performs steps including: calculating, for each block of a plurality of blocks of a frame, a corresponding quality value; calculating, for each block of the plurality of blocks, based on one or more visual attributes of a block, a weight for the corresponding quality value of the block; calculating an aggregate quality value for the frame based on the weight and the corresponding quality value for each block for the plurality of blocks; and provide an assessment based on the aggregate quality value for the frame.

In some embodiments, each block includes one or more rows of pixels and one or more columns of pixels within the frame. In some embodiments, the one or more visual attributes of the block include a temporal complexity of the block, a spatial complexity of the block, the corresponding quality value of the block, or an importance value of the block based on an importance map of the frame. In some embodiments, the steps further include generating an importance map of the frame by classifying areas of the frame into one or more categories. In some embodiments, the one or more categories include a flat area, a textured area, or an edge area. In some embodiments, the frame is included in a plurality of frames, and the steps further include calculating, based on the aggregate quality value for the frame and one or more other aggregate quality values for one or more other frames, an aggregate quality value for the plurality of frames.

FIG. 1 is a block diagram of a non-limiting example computer 100 for video quality assessment using aggregated quality values. The example processor 100 can be implemented in as variety of computing devices, including mobile devices, personal computers, peripheral hardware components, gaming devices, and the like. The computer 100 of FIG. 1 includes at least one computer processor 102 or 'CPU' as well as random access memory 104 (RAM') which is connected through a high speed memory bus 106 and bus adapter 108 to processor 102 and to other components of the computer 100.

Stored in RAM 104 is an operating system 110. Operating systems useful in computers configured for video quality assessment using aggregated quality values according to certain embodiments include UNIX", Linux™, Microsoft Windows™, and others as will occur to those of skill in the art. The operating system 110 in the example of FIG. 1 is shown in RAM 104, but many components of such software typically are stored in non-volatile memory also, such as, for example, on data storage 112, such as a disk drive. Also stored in RAM is the quality assessment module 114 a module for video quality assessment using aggregated quality values according to certain embodiments.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for video quality assessment using aggregated quality values according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output ('I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for video quality assessment using aggregated quality values according to certain embodiments include modems for wired dial-up communications, Ethernet (IEEE 802.3) adapters for wired data communications, and 802.11 adapters for wireless data communications.

Existing solutions for calculating a quality value for a video sequence (e.g., for a plurality of frames of video) include calculating a quality value (e.g., a quality index) for each frame and average these quality values together to form a quality value for the video sequence. This includes applying a quality metric algorithm to each frame, such as peak signal-to-noise ratio (PSNR), structural similarity (SSIM), multi-scale structural similarity (MM-SSIM), and video multimethod assessment fusion (VMAF). This approach assumes that each block of a given frame contributes equally to the quality value of the frame, and that each frame contributes equally to the quality of the video sequence. However, the human vision system would not perceive the quality of each frame and/or block equally. For example, the human vision system has different sensitivities to distortion depending on the spatial simplicity or complexity of a scene, or the amount of movement in the scene. As another example, the human vision system would find lower quality blocks more detrimental than would find substantially higher quality blocks beneficial.

Accordingly, in some embodiments, a quality assessment module 114 calculates an aggregate quality value for a plurality of frames (e.g., of a video sequence) by assigning weights to each frame based on visual attributes of the frames. For example, the quality assessment module 114 calculates, for each frame of a plurality of frames, a corresponding quality value. The quality value for each frame is calculating applying a quality metric algorithm to the entire frame, such as peak signal-to-noise ratio (PSNR), structural similarity (SSIM), multi-scale structural similarity (MM-SSIM), and video multimethod assessment fusion (VMAF). One skilled in the art will appreciate that, in some embodiments, other quality metric algorithms are used.

The quality assessment module 114 then calculates, for each frame of the plurality of frames, based on one or more visual attributes of a frame, a weight for the corresponding quality value of the frame. In other words, for a given frame, the quality assessment module 114 calculates a weight based on the visual attributes of the given frame. The calculated weight will then be applied to the corresponding quality value for the given frame, as will be described in more detail below.

In some embodiments, the one or more visual attributes of the frame include a temporal complexity. The temporal complexity represents a degree of variance between the given frame and one or more other frames, such as sequentially adjacent frames. In some embodiments, the temporal complexity is based on a pixel difference with respect to one or more neighboring frames (e.g., a sequentially adjacent frame preceding or subsequent to the given frame). For example, the temporal complexity is a sum of absolute values of pixel differences with respect to neighboring frames. In some embodiments, the temporal complexity is based on one or more motion vectors of the given frame. For example, the temporal complexity is a sum of absolute values of motion vectors for the given frame. In some embodiments, other values for the temporal complexity are used.

In some embodiments, the one or more visual attributes of the frame include a spatial complexity. The spatial complexity represents a degree of variance within the given frame. For example, the spatial complexity is calculated by subdividing the frame into a plurality of areas and calculating, as the spatial complexity, a sum of the variance across the areas. In some embodiments, other values for the temporal complexity are used. In some embodiments, the one or more visual attributes of the frame include the corresponding quality value for the given frame. In other words, the weight for a given frame is calculated as a function of its corresponding quality value.

As an example, the weight for a given frame k is calculated as $w_k = f_f(t_k, s_k, PQ_k)$, where $w_k$ is the weight for the given frame k, $t_k$ is the temporal complexity for the given frame, $s_k$ is the spatial complexity for the given frame, and $PQ_k$ is the quality value for the given frame. The function $f_f$ is chosen and/or tuned according to how the various visual attributes will affect the overall weight. For example, in some embodiments, the function is chosen to be inversely proportional to the input attributes such that the more complex a frame is, the more motion a frame has, or the higher quality the frame, the less weight it will have in the final aggregate quality value. One skilled in the art will appreciate that this is merely an example, and that, in some embodiments, other functions, visual attributes, and the like will be used.

In some embodiments, where the one or more visual attributes includes the quality value of the given frame, calculating the weights for each frame of the plurality of frames includes identifying a first subset of the plurality of frames having quality values falling below a threshold and identifying a second subset of the plurality of frames having quality values meeting or exceeding the threshold. In some embodiments, the threshold is a predefined or set quality value. In other embodiments, the threshold is calculated based on a highest or lowest percentile of quality values. For example, the threshold is calculated to select, as the first subset, the N % lowest quality frames (e.g., the frames with the N % lowest quality values).

A first weight is then assigned to each frame in the first subset and a second weight is assigned to each frame in the second subset. For example, a weight $\mu_1$ is assigned to each frame in the first subset and a weight $(1-\mu_1)$ is assigned to each frame in the second subset. In some embodiments, selecting the frames in the first subset and second subset is performed after calculating weights for each frame as described above (e.g., based on temporal complexity, spatial complexity, etc.) such that each frame is placed in the first or second subset based on their respective weighted quality values. The weighted quality values are then further weighted based on the first or second weight, depending into which subset the particular frame falls.

The quality assessment module 114 then calculates an aggregate quality value for the plurality of frames based on the weight and the corresponding quality value for each frame of the plurality of frames. In other words, the aggregate quality value for the plurality of frames is based on the weighted quality values of each frame of the plurality of frames. For example, the aggregate quality value is a weighted average or weighted summation of the corresponding quality values of the plurality of frames. For example, in some embodiments, the aggregate quality value for the plurality of frames $PQ_{seq}$ is calculated as $PQ_{seq} = w_1 \times PQ_1 + w_2 \times PQ_2 + \ldots + w_n \times PQ_n$, where $w_k$, $k=1 \ldots n$ is the weight for each frame and $PQ_k$, $k=1 \ldots n$ is the corresponding quality value for each frame.

In some embodiments, the quality assessment module 114 is configured to calculate an aggregate quality value for a frame based on weighted quality values for each of a plurality of blocks in the frame. A block is a subdivision of a frame composed of multiple pixels. For example, the block includes one or more rows of pixels and one or more columns of pixels. Thus, a given frame is composed of a plurality of blocks.

Accordingly, the quality assessment module 114 calculates, for each block of a plurality of blocks of a frame, a corresponding quality value. The quality value for a block is calculated similar to the quality value for an entire frame, with the quality metric algorithm (e.g., peak signal-to-noise ratio (PSNR), structural similarity (SSIM), multi-scale structural similarity (MM-SSIM), and video multimethod assessment fusion (VMAF), and the like) applied to a block instead of the entire frame.

The quality assessment module 114 then calculates, for each block of the plurality of blocks, based on one or more visual attributes of the block, a weight for the corresponding quality value of the block. In some embodiments, the weight for a corresponding quality value of a block is calculated similar to the weight for a quality value of a frame, as described above. For example, the visual attributes for calculating the weight for the quality value of the block include a temporal complexity, spatial complexity, and/or quality value each calculated with respect to the given block.

In some embodiments, the one or more visual attributes of the block includes an importance value for the block as determined according to an importance map of the frame. For example, in some embodiments, a weight $w_{Bk}$ for the quality value of a given block is calculated as $w_{Bk} = f_f(t_{Bk}, s_{Bk}, roi_{Bk}, PQ_{Bk})$, where $t_{Bk}$, $s_{Bk}$, $PQ_{Bk}$ are a temporal complexity, a spatial complexity, and quality value of the block, respectively, and $roi_{Bk}$ is the importance value. An importance map subdivides a frame into various regions and assigns an importance value to each region. Thus, the importance value of a block is based on the importance values of the region(s) into which the block is included. For example, in some embodiments, the quality assessment module 114 generates the importance map by applying an image classification algorithm to identify one or more regions of the image. Examples of identifiable regions include areas of skin tone or other colors, flat areas, textured areas, edge areas, etc. Each region corresponds to an importance value. The importance value of the block is then calculated as a function of the importance value(s) of the region(s) into which the block is included.

The quality assessment module 114 then calculates an aggregate quality value for the frame based on the weight and the corresponding quality value for each block of the plurality of blocks. In other words, the aggregate quality value of a given frame is an aggregate function of the weighted quality values for each block within the given frame. For example, the aggregate quality value for a given frame $PQ_{frm}$ is expressed as $PQ_{frm} = w_{B1} \times PQ_{B1} + w_{B2} \times PQ_{B2} + \ldots + w_{Bn} \times PQ_{Bn}$ where $w_{Bk}$, $k=1 \ldots n$ is the weight for each block and $PQ_{Bk}$ is the corresponding quality value for each block.

In some embodiments, the quality assessment module 114 calculates an aggregate quality value for a plurality of frames (e.g., a video sequence) based on the aggregate quality values for each frame, where the quality value for each frame is based on weighted quality values for its component blocks. For example, in some embodiments, the aggregate quality value for the plurality of frames is an average quality value or other aggregate of the quality values for each frame of the plurality of frames. In other embodiments, the aggregate quality value for the plurality of frames is calculated as described above as an aggregation of weighted quality values for each frame.

Figure 2:
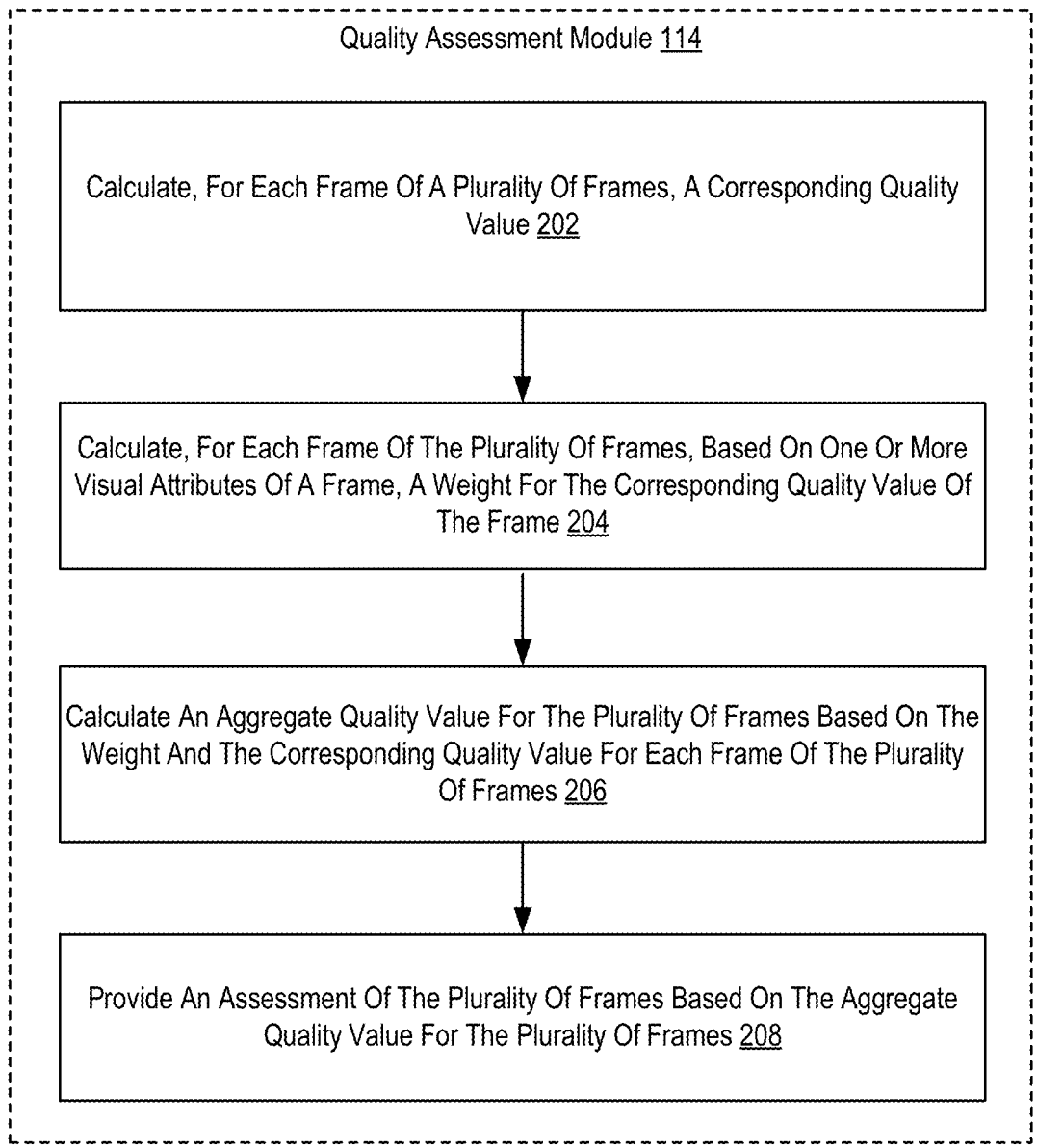
FIG. 2 is a flowchart of an example method for video quality assessment using aggregated quality values according to some embodiments.

For further explanation, FIG. 2 sets forth a flow chart illustrating an exemplary method for video quality assessment using aggregated quality values that includes calculating 202 (e.g., by a quality assessment module 114), for each frame of a plurality of frames (e.g., of a video sequence), a corresponding quality value. The quality value for each frame is calculating applying a quality metric algorithm to the entire frame, such as peak signal-to-noise ratio (PSNR), structural similarity (SSIM), multi-scale structural similarity (MM-SSIM), and video multimethod assessment fusion (VMAF). One skilled in the art will appreciate that, in some embodiments, other quality metric algorithms are used.

The method of FIG. 2 also includes calculating 204 (e.g., by the quality assessment module 114), for each frame of the plurality of frames, based on one or more visual attributes of a frame, a weight for the corresponding quality value of the frame. In other words, for a given frame, the quality assessment module 114 calculates a weight based on the visual attributes of the given frame. The calculated weight will then be applied to the corresponding quality value for the given frame, as will be described in more detail below.

In some embodiments, the one or more visual attributes of the frame include a temporal complexity. The temporal complexity represents a degree of variance between the given frame and one or more other frames, such as sequentially adjacent frames. In some embodiments, the temporal complexity is based on a pixel difference with respect to one or more neighboring frames (e.g., a sequentially adjacent frame preceding or subsequent to the given frame). For example, the temporal complexity is a sum of absolute values of pixel differences with respect to neighboring frames. In some embodiments, the temporal complexity is based on one or more motion vectors of the given frame. For example, the temporal complexity is a sum of absolute values of motion vectors for the given frame. In some embodiments, other values for the temporal complexity are used.

In some embodiments, the one or more visual attributes of the frame include a spatial complexity. The spatial complexity represents a degree of variance within the given frame. For example, the spatial complexity is calculated by subdividing the frame into a plurality of areas and calculating, as the spatial complexity, a sum of the variance across the areas. In some embodiments, other values for the spatial complexity are used. In some embodiments, the one or more visual attributes of the frame include the corresponding quality value for the given frame. In other words, the weight for a given frame is calculated as a function of its corresponding quality value.

As an example, the weight for a given frame k is calculated as $w_k = f_f(t_k, s_k, PQ_k)$, where $w_k$ is the weight for the given frame k, $t_k$ is the temporal complexity for the given frame, $s_k$ is the spatial complexity for the given frame, and $PQ_k$ is the quality value for the given frame. The function $f_f$ is chosen and/or tuned according to how the various visual attributes will affect the overall weight. For example, in some embodiments, the function is chosen to be inversely proportional to the input attributes such that the more complex a frame is, the more motion a frame has, or the higher quality the frame, the less weight it will have in the final aggregate quality value. One skilled in the art will appreciate that this is merely an example, and that, in some embodiments, other functions, visual attributes, and the like will be used.

The method of FIG. 2 also includes calculating 206 (e.g., by the quality assessment module 114) an aggregate quality value for the plurality of frames based on the weight and the corresponding quality value for each frame of the plurality of frames. In other words, the aggregate quality value for the plurality of frames is based on the weighted quality values of each frame of the plurality of frames. For example, the aggregate quality value is a weighted average or weighted summation of the corresponding quality values of the plurality of frames. For example, in some embodiments, the aggregate quality value for the plurality of frames $PQ_{seq}$ is calculated as $PQ_{seq} = w_1 \times PQ_1 + w_2 \times PQ_2 + \ldots + w_n \times PQ_n$, where $w_k$, $k=1 \ldots n$ is the weight for each frame and $PQ_k$, $k=1 \ldots n$ is the corresponding quality value for each frame.

The method of FIG. 2 also includes providing 208 an assessment of the plurality of frames based on the aggregate quality value for the plurality of frames. The assessment indicates a level or degree of quality for the plurality of frames based on the aggregate quality value for the plurality of frames. In some embodiments, the assessment includes an indication of the aggregate quality value. In other embodiments, the assessment includes a label or classification of a quality level based on the aggregate quality value for the plurality of frames. In some embodiments, the label or classification is based on a range, bin, or other grouping into which the aggregate quality value for the plurality of frames falls. For example, in some embodiments, labels such as "Low Quality," "Medium Quality," and "High Quality" each correspond to mutually exclusive numerical ranges of aggregate quality values. The assessment then indicates the particular label for the range that includes the aggregate quality value for the plurality of frames. In some embodiments, providing 208 the assessment includes outputting the assessment to a display or user interface. In some embodiments, providing 208 the assessment includes storing data indicating the assessment.

Figure 3:
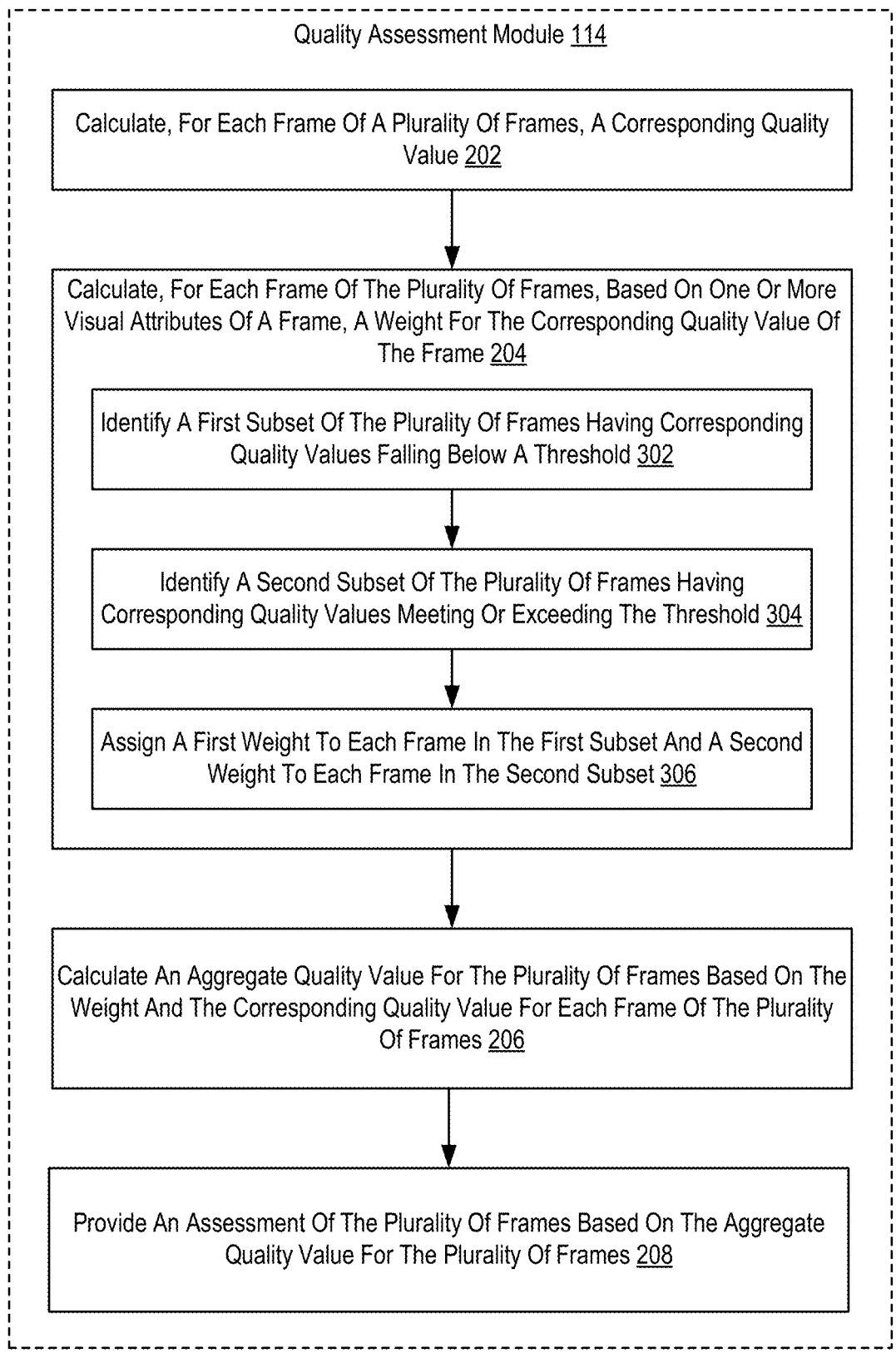
FIG. 3 is a flowchart of an example method for video quality assessment using aggregated quality values according to some embodiments.

For further explanation, FIG. 3 sets forth a flow chart illustrating an exemplary method for video quality assessment using aggregated quality values that includes calculating 202 (e.g., by a quality assessment module 114), for each frame of a plurality of frames, a corresponding quality value; calculating 204 (e.g., by the quality assessment module 114), for each frame of the plurality of frames, based on one or more visual attributes of a frame, a weight for the corresponding quality value of the frame; calculating 206 (e.g., by the quality assessment module 114) an aggregate quality value for the plurality of frames based on the weight and the corresponding quality value for each frame of the plurality of frames; and providing 208 an assessment of the plurality of frames based on the aggregate quality value for the plurality of frames.

The method of FIG. 3 differs from FIG. 2 in that calculating 204, for each frame of the plurality of frames, based on one or more visual attributes of a frame, a weight for the corresponding quality value of the frame includes identifying 302 a first subset of the plurality of frames having corresponding quality values falling below a threshold; and identifying 304 a second subset of the plurality of frames having corresponding quality values meeting or exceeding the threshold. In some embodiments, the threshold is a predefined or set quality value. In other embodiments, the threshold is calculated based on a highest or lowest percentile of quality values. For example, the threshold is calculated to select, as the first subset, the N % lowest quality frames (e.g., the frames with the N % lowest quality values).

The method of FIG. 3 differs from FIG. 2 in that calculating 204, for each frame of the plurality of frames, based on one or more visual attributes of a frame, a weight for the corresponding quality value of the frame includes assigning 306 a first weight to each frame in the first subset and a second weight to each frame in the second subset. For example, a weight $\mu_1$ is assigned to each frame in the first subset and a weight $(1-\mu_1)$ is assigned to each frame in the second subset. In some embodiments, selecting the frames in the first subset and second subset is performed after calculating weights for each frame as described above (e.g., based on temporal complexity, spatial complexity, etc.) such that each frame is placed in the first or second subset based on their respective weighted quality values. The weighted quality values are then further weighted based on the first or second weight, depending into which subset the particular frame falls.

Figure 4:
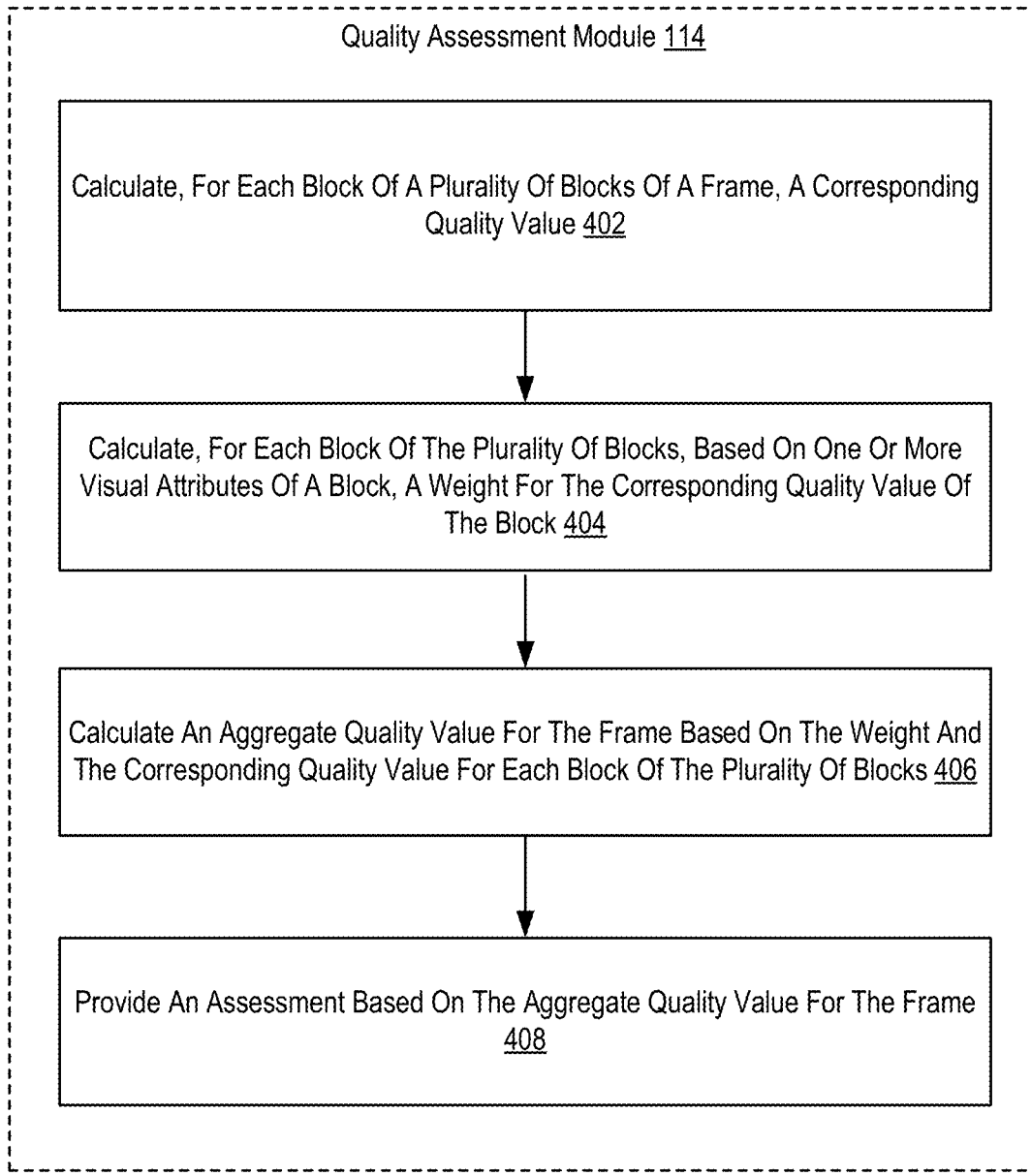
FIG. 4 is a flowchart of an example method for video quality assessment using aggregated quality values according to some embodiments.

For further explanation, FIG. 4 sets forth a flow chart illustrating an exemplary method for video quality assessment using aggregated quality values that includes calculating 402, for each block of a plurality of blocks of a frame, a corresponding quality value. The quality value for a block is calculated similar to the quality value for an entire frame, with the quality metric algorithm (e.g., peak signal-to-noise ratio (PSNR), structural similarity (SSIM), multi-scale structural similarity (MM-SSIM), and video multimethod assessment fusion (VMAF), and the like) applied to a block instead of the entire frame.

The method of FIG. 4 also includes calculating 404, for each block of the plurality of blocks, based on one or more visual attributes of the block, a weight for the corresponding quality value of the block. In some embodiments, the weight for a corresponding quality value of a block is calculated similar to the weight for a quality value of a frame, as described above with respect to FIG. 2. For example, the visual attributes for calculating the weight for the quality value of the block include a temporal complexity, spatial complexity, and/or quality value each calculated with respect to the given block.

The method of FIG. 4 also includes calculating 406 an aggregate quality value for the frame based on the weight and the corresponding quality value for each block of the plurality of blocks. In other words, the aggregate quality value of a given frame is an aggregate function of the weighted quality values for each block within the given frame. For example, the aggregate quality value for a given frame $PQ_{frm}$ is expressed as $PQ_{frm}=w_{B1} \times PQ_{B1}+w_{B2} \times PQ_{B2}+ \ldots +w_{Bn} \times PQ_{Bn}$ where $w_{Bk}$, k=1 n is the weight for each block and $PQ_{Bk}$ is the corresponding quality value for each block.

The method of FIG. 4 also includes providing 408 an assessment based on the aggregate quality value for the frame. The assessment indicates a level or degree of quality for the frame or a plurality of frames including the frame. For example, in some embodiments, the assessment is based on an aggregate quality value for a plurality of frames, where the aggregate quality value for the plurality of frames is based on the aggregate quality value for the frame. In some embodiments, the assessment includes an indication of an aggregate quality value (e.g., of the frame, of a plurality of frames including the frame). In other embodiments, the assessment includes a label or classification of a quality level based on the aggregate quality value (e.g., of the frame, of a plurality of frames including the frame). In some embodiments, the label or classification is based on a range, bin, or other grouping into which the aggregate quality value falls. In some embodiments, providing 408 the assessment includes outputting the assessment to a display or user interface. In some embodiments, providing 408 the assessment includes storing data indicating the assessment.

Figure 5:
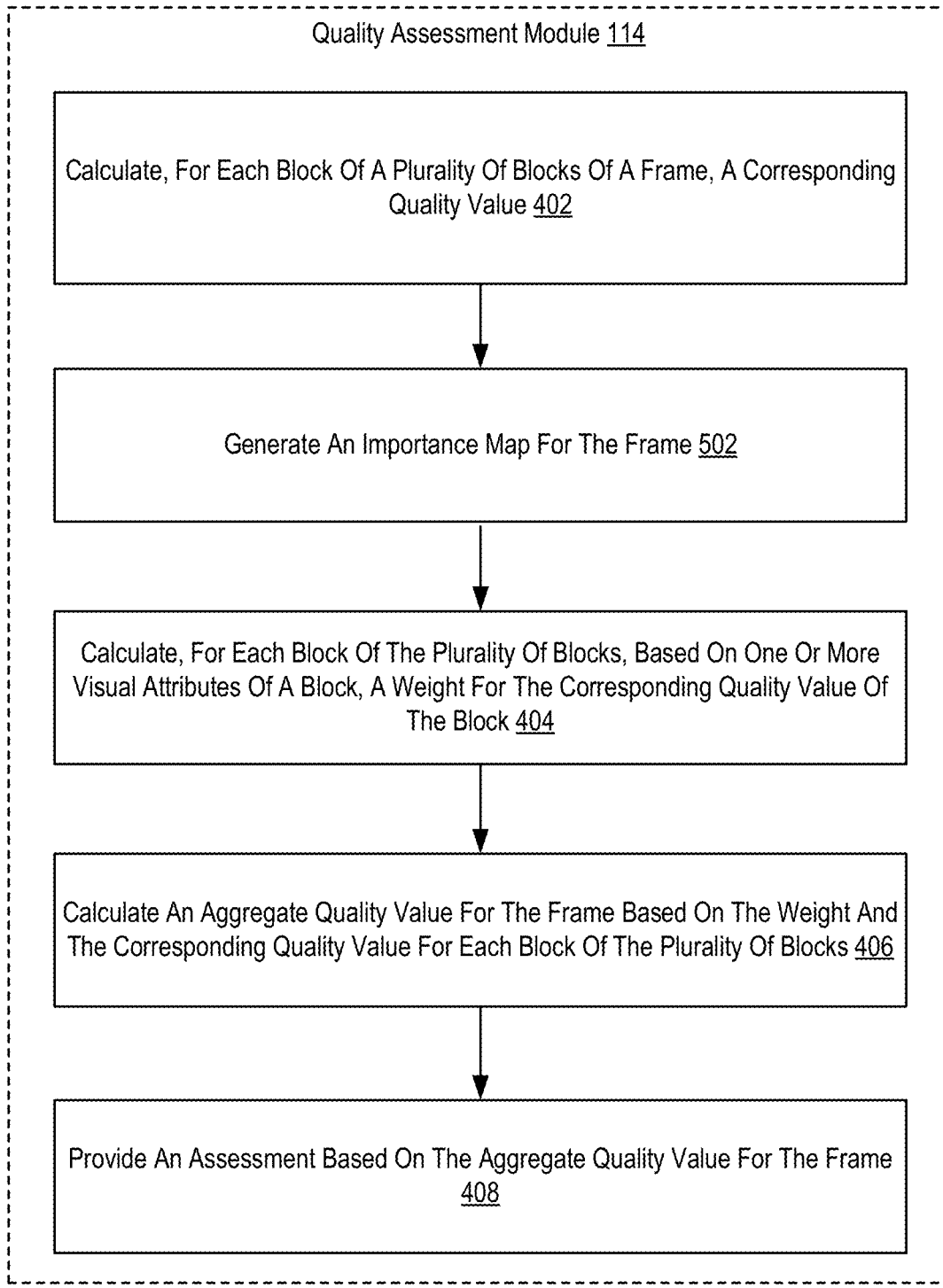
FIG. 5 is a flowchart of an example method for video quality assessment using aggregated quality values according to some embodiments.

For further explanation, FIG. 5 sets forth a flow chart illustrating an exemplary method for video quality assessment using aggregated quality values that includes calculating 402, for each block of a plurality of blocks of a frame, a corresponding quality value; calculating 404, for each block of the plurality of blocks, based on one or more visual attributes of the block, a weight for the corresponding quality value of the block; calculating 406 an aggregate quality value for the frame based on the weight and the corresponding quality value for each block of the plurality of blocks; and providing 408 an assessment based on the aggregate quality value for the frame.

The method of FIG. 5 differs from FIG. 4 in that the method of FIG. 5 includes generating 502 an importance map for the frame. An importance map subdivides a frame into various regions and assigns an importance value to each region. Thus, the importance value of a block is based on the importance values of the region(s) into which the block is included. For example, in some embodiments, the quality assessment module 114 generates the importance map by applying an image classification algorithm to identify one or more regions of the image. Examples of identifiable regions include areas of skin tone or other colors, flat areas, textured areas, edge areas, etc. Each region corresponds to an importance value. The importance value of the block is then calculated as a function of the importance value(s) of the region(s) into which the block is included. In some embodiments, the importance value for a block is then a factor in calculating the weight for the quality value of the block. For example, in some embodiments, a weight $w_{Bk}$ for the quality value of a given block is calculated as $w_{Bk}=f_f(t_{Bk}, s_{Bk}, roi_{Bk}, PQ_{Bk})$, where $t_{Bk}$, $s_{Bk}$, $PQ_{Bk}$ are a temporal complexity, a spatial complexity, and quality value of the block, respectively, and $roi_{Bk}$ is the importance value.

Figure 6:
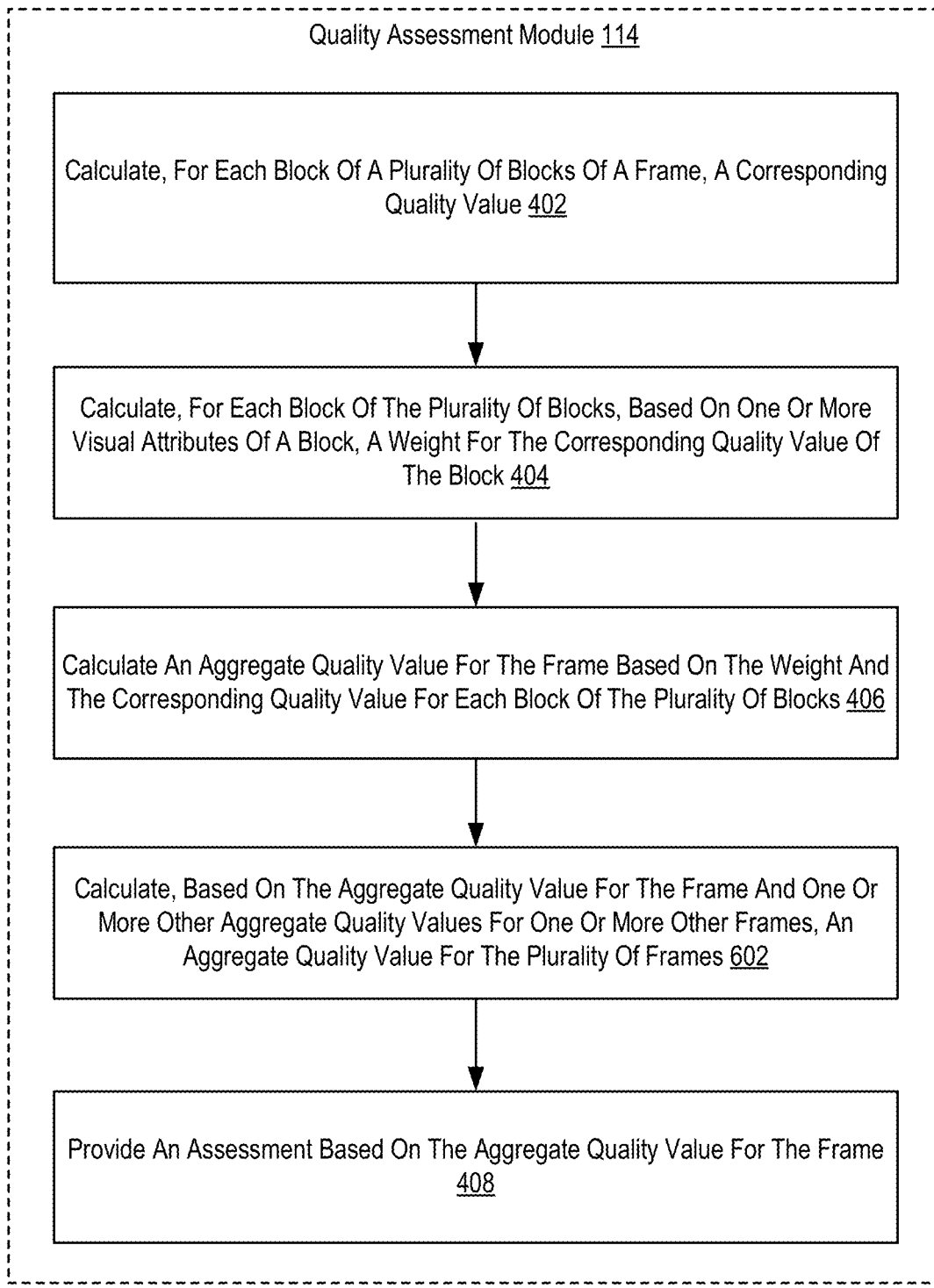
FIG. 6 is a flowchart of an example method for video quality assessment using aggregated quality values according to some embodiments.

For further explanation, FIG. 6 sets forth a flow chart illustrating an exemplary method for video quality assessment using aggregated quality values that includes calculating 402, for each block of a plurality of blocks of a frame, a corresponding quality value; calculating 404, for each block of the plurality of blocks, based on one or more visual attributes of the block, a weight for the corresponding quality value of the block; calculating 406 an aggregate quality value for the frame based on the weight and the corresponding quality value for each block of the plurality of blocks; and providing 408 an assessment based on the aggregate quality value for the frame.

The method of FIG. 6 differs from FIG. 5 in that the method of FIG. 6 includes calculating 602, based on the aggregate quality value for the frame and one or more other aggregate quality values for one or more other frames, an aggregate quality value for the plurality of frames. For example, in some embodiments, the aggregate quality value for the plurality of frames is an average quality value or other aggregate of the quality values for each frame of the plurality of frames. In other embodiments, the aggregate quality value for the plurality of frames is calculated as described above, such as with respect to FIGS. 2 and 3, as an aggregation of weighted quality values for each frame.

In view of the explanations set forth above, readers will recognize that the benefits of video quality assessment using aggregated quality values include:

Improved performance of a computing system by calculating quality values for frames or sequences of frames reflecting the attributes of the human vision system.

Exemplary embodiments of the present disclosure are described largely in the context of a fully functional computer system for video quality assessment using aggregated quality values. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of video quality assessment using aggregated quality values, the method comprising:
   calculating, for each frame of a plurality of frames, a corresponding quality value;
   calculating, for each frame of the plurality of frames, based on one or more visual attributes of a frame, a weight for the corresponding quality value of the frame;
   calculating an aggregate quality value for the plurality of frames based on the weight and the corresponding quality value for each frame of the plurality of frames; and
   providing an assessment of the plurality of frames based on the aggregate quality value for the plurality of frames.

2. The method of claim 1, wherein the one or more visual attributes of the frame comprise a temporal complexity of the frame, a spatial complexity of the frame, and/or the corresponding quality value of the frame.

3. The method of claim 2, wherein the one or more visual attributes of the frame comprise the corresponding quality value of the frame, and calculating, for each frame of the plurality of frames, the weight for the corresponding quality value of the frame comprises:
   identifying a first subset of the plurality of frames having corresponding quality values falling below a threshold;
   identifying a second subset of the plurality of frames having corresponding quality values meeting or exceeding the threshold; and
   assigning a first weight to each frame in the first subset and a second weight to each frame in the second subset.

4. The method of claim 2, wherein the temporal complexity of the frame is based on one or more pixel differences with respect to one or more other frames and/or one or more motion vectors.

5. The method of claim 2, wherein the spatial complexity is based on a degree of variance of one or more areas within the frame.

6. An apparatus for video quality assessment using aggregated quality values, the apparatus comprising a processor and memory, the memory storing instructions executed by the processor to:
   calculate, for each frame of a plurality of frames, a corresponding quality value;
   calculate, for each frame of the plurality of frames, based on one or more visual attributes of a frame, a weight for the corresponding quality value of the frame;
   calculate an aggregate quality value for the plurality of frames based on the weight and the corresponding quality value for each frame of the plurality of frames; and
   provide an assessment of the plurality of frames based on the aggregate quality value for the plurality of frames.

7. The apparatus of claim 6, wherein the one or more visual attributes of the frame comprise a temporal complexity of the frame, a spatial complexity of the frame, and/or the corresponding quality value of the frame.

8. The apparatus of claim 7, wherein the one or more visual attributes of the frame comprise the corresponding quality value of the frame, and the instructions to calulate, for each frame of the plurality of frames, the weight for the corresponding quality value of the frame further comprise instructions that are executed by the processor to:
   identify a first subset of the plurality of frames having corresponding quality values falling below a threshold;
   identify a second subset of the plurality of frames having corresponding quality values meeting or exceeding the threshold; and
   assign a first weight to each frame in the first subset and a second weight to each frame in the second subset.

9. The apparatus of claim 7, wherein the temporal complexity of the frame is based on one or more pixel differences with respect to one or more other frames and/or one or more motion vectors.

10. The apparatus of claim 7, wherein the spatial complexity is based on a degree of variance of one or more areas within the frame.

11. A method of video quality assessment using aggregated quality values, the method comprising:
    calculating, for each block of a plurality of blocks of a frame, a corresponding quality value;
    calculating, for each block of the plurality of blocks, based on one or more visual attributes of a block, a weight for the corresponding quality value of the block, wherein the one or more visual attributes of the block comprise an importance value of the block based on an importance map of the frame;
    calculating an aggregate quality value for the frame based on the weight and the corresponding quality value for each block for the plurality of blocks; and providing an assessment based on the aggregate quality value for the frame.

12. The method of claim 11, wherein each block comprises one or more rows of pixels and one or more columns of pixels within the frame.

13. The method of claim 11, wherein the one or more visual attributes of the block comprise a temporal complexity of the block, a spatial complexity of the block, or the corresponding quality value of the block.

14. The method of claim 11, further comprising generating the importance map of the frame by classifying areas of the frame into one or more categories.

15. The method of claim 14, wherein the one or more categories include a flat area, a textured area, or an edge area.

16. The method of claim 11, wherein the frame is included in a plurality of frames, and the method further comprises calculating, based on the aggregate quality value for the frame and one or more other aggregate quality values for one or more other frames, an aggregate quality value for the plurality of frames.

17. An apparatus for video quality assessment using aggregated quality values, the apparatus comprising a processor and memory, the memory storing instructions executed by the processor to:
calculate, for each block of a plurality of blocks of a frame, a corresponding quality value;
calculate, for each block of the plurality of blocks, based on one or more visual attributes of a block, a weight for the corresponding quality value of the block, wherein the one or more visual attributes of the block comprise an importance value of the block based on an importance map of the frame;
calculate an aggregate quality value for the frame based on the weight and the corresponding quality value for each block for the plurality of blocks; and
provide an assessment based on the aggregate quality value for the frame.

18. The apparatus of claim 17, wherein each block comprises one or more rows of pixels and one or more columns of pixels within the frame.

19. The apparatus of claim 17, wherein the one or more visual attributes of the block comprise a temporal complexity of the block, a spatial complexity of the block, or the corresponding quality value of the block.

20. The apparatus of claim 19, further comprising instructions executed by the processor to
generate the importance map of the frame by classifying areas of the frame into one or more categories.

21. The apparatus of claim 20, wherein the one or more categories include a flat area, a textured area, or an edge area.

22. The apparatus of claim 17, wherein the frame is included in a plurality of frames, and the apparatus further comprises instructions executed by the processor to calculate, based on the aggregate quality value for the frame and one or more other aggregate quality values for one or more other frames, an aggregate quality value for the plurality of frames.

* * * * *